US007813732B2

(12) United States Patent
Grilli et al.

(10) Patent No.: US 7,813,732 B2
(45) Date of Patent: *Oct. 12, 2010

(54) METHOD AND APPARATUS TO TRACK COUNT OF BROADCAST CONTENT RECIPIENTS IN A WIRELESS TELEPHONE NETWORK

(75) Inventors: Francesco Grilli, La Jolla, CA (US); Lorenzo Casaccia, Rome (IT)

(73) Assignee: Qualcomm Incorporated, San Diego, CA (US)

( * ) Notice: Subject to any disclaimer, the term of this patent is extended or adjusted under 35 U.S.C. 154(b) by 664 days.

This patent is subject to a terminal disclaimer.

(21) Appl. No.: 11/750,843

(22) Filed: May 18, 2007

(65) Prior Publication Data

US 2008/0004019 A1 Jan. 3, 2008

Related U.S. Application Data

(62) Division of application No. 10/368,876, filed on Feb. 18, 2003.

(51) Int. Cl.
H04W 4/00 (2009.01)
H04M 3/42 (2006.01)
H04B 7/00 (2006.01)
(52) U.S. Cl. .............. 455/435.1; 455/435.2; 455/414.1; 455/434; 455/515
(58) Field of Classification Search .............. 455/435.1, 455/435.2, 405, 414.1, 515, 451, 435
See application file for complete search history.

(56) References Cited

U.S. PATENT DOCUMENTS 6,195,680 B1 2/2001 Goldszmidt et al.

6,618,585 B1 9/2003 Robinson (Continued)

FOREIGN PATENT DOCUMENTS

EP 1271842 1/2003

(Continued)

OTHER PUBLICATIONS

CDMA2000 (IS-2000.2), 3GPP2 C.S0002-0 Version 1.0, Jul. 1999, Physical Layer Standard for CDMA2000 Spread Spectrum Systems.

(Continued)

Primary Examiner—Vincent P Harper
Assistant Examiner—Timothy Pham
(74) Attorney, Agent, or Firm—Won Tae C. Kim; John J. Ketchum

(57) ABSTRACT

A base station in a wireless communications network counts mobile stations receiving broadcast content via multi-user channel. The base station broadcasts a repeating message identifying at least one broadcast content stream and, for each stream, a REGISTER (R) or DO NOT REGISTER (DNR) indicator. Mobile stations periodically re-examine contents of this message. When the indicator is R for a broadcast content stream, mobile stations whose users have elected to receive it send the base station a registration message for that stream. When the number of registered mobile stations reaches a prescribed number, the base station changes the indicator to DNR. When the indicator is DNR for a broadcast content stream, mobile stations refrain from sending any registration message for that broadcast content stream. The base station may institute a recount by resetting the indicator to R.

18 Claims, 8 Drawing Sheets

U.S. PATENT DOCUMENTS

| | | |
|---|---|---|
| 6,704,576 B1 | 3/2004 | Brachman et al. |
| 6,810,234 B1 | 10/2004 | Rasanen et al. |
| 6,909,702 B2 | 6/2005 | Leung et al. |
| 6,950,439 B1 | 9/2005 | Bhagavath et al. |
| 6,980,820 B2 | 12/2005 | Sinnarajah et al. |
| 7,062,272 B2 | 6/2006 | Grilli et al. |
| 7,096,024 B2 | 8/2006 | Sinnarajah et al. |
| 7,099,655 B2 * | 8/2006 | Song et al. .................. 455/411 |
| 7,236,465 B2 | 6/2007 | Banerjee et al. |
| 7,277,694 B2 | 10/2007 | Sinnarajah et al. |
| 7,283,782 B2 | 10/2007 | Sinnarajah et al. |
| 7,349,425 B2 | 3/2008 | Leung et al. |
| 7,363,643 B2 | 4/2008 | Drake et al. |
| 7,391,724 B2 | 6/2008 | Alakoski et al. |
| 7,395,067 B2 | 7/2008 | Weigand |
| 2002/0138830 A1 | 9/2002 | Nagaoka et al. |
| 2003/0035389 A1 | 2/2003 | Chen et al. |
| 2003/0104832 A1 | 6/2003 | Ferris |
| 2003/0206554 A1 | 11/2003 | Dillon |
| 2004/0029525 A1 | 2/2004 | Vertelney |
| 2004/0131075 A1 | 7/2004 | Sinnarajah et al. |
| 2004/0203773 A1 * | 10/2004 | Balasubramanian et al. ..... 455/435.1 |

FOREIGN PATENT DOCUMENTS

| | | |
|---|---|---|
| EP | 1274263 | 1/2003 |

OTHER PUBLICATIONS

Balasubramanian, et al., "Broadcast Service Activation Based on Mobile Station Location," Ericsson's submission to 3GPP2-TSG-C2.3 in Portland, Oregon, 5 pages. (2002).

Balasubramanian, et al., "Scenarios Suggesting the Use of Registration Required Flag," Ericsson's submission to 3GPP2-C2.3-20021021-007. 6 pages (Oct. 2002).

Balasubramanian, et al., "Shaping the Transmission Area of Broadcast/Multicast Service Based on Mobile Stations' Location Using RegistrationRequired Flag," Ericsson's submission to 3GPP2-TSG-C23-20020909-012, 5 pages (Sep. 2002).

International Search Report—PCT/US04/004789, International Search Authority—European Patent Office, Aug. 30, 2004.

* cited by examiner

IDLE MESSAGING

ACCESS MESSAGING

TRAFFIC MESSAGING

METHOD AND APPARATUS TO TRACK COUNT OF BROADCAST CONTENT RECIPIENTS IN A WIRELESS TELEPHONE NETWORK

CLAIM OF PRIORITY UNDER 35 U.S.C. §120

The present Application for patent is a continuation of U.S. patent application Ser. No. 11/387,638, entitled "Method and Apparatus to Track Count of Broadcast Content Recipients in a Wireless Telephone Network" filed Mar. 22, 2006, now allowed, which is a divisional application of U.S. patent application Ser. No. 10/368,876, filed Feb. 18, 2003, now U.S. Pat. No. 7,062,272, and assigned to the assignee hereof and hereby expressly incorporated by reference herein.

BACKGROUND

1. Field

The present invention generally relates to wireless communication networks that provide broadcast content to mobile stations upon various multi-user ("shared") and/or individual ("dedicated") forward link broadcast channels. More particularly, the invention concerns various embodiments of method and/or apparatus to count mobile stations receiving specified broadcast content from a given base station.

2. Background

Many known communication systems transmit information signals from an origination station to a physically distinct destination station. The information signal is first converted into a form suitable for efficient transmission over the communication channel. Conversion, or modulation, of the information signal involves varying a parameter of a carrier wave in accordance with the information signal in such a way that the spectrum of the resulting modulated carrier is confined within the communication channel bandwidth. At the destination station the original information signal is replicated from the modulated carrier wave received over the communication channel. Such a replication is generally achieved by using an inverse of the modulation process employed by the origination station.

Modulation also facilitates multiple-access, that is, simultaneous transmission and/or reception, of several signals over a common communication channel. Multiple-access communication systems often include a plurality of subscriber units requiring intermittent service of relatively short duration rather than continuous access to the common communication channel. Several multiple-access techniques are known in the art, such as time division multiple-access (TDMA), frequency division multiple-access (FDMA), amplitude modulation multiple-access (AM), and code division multiple-access (CDMA) spread spectrum. Multiple-access communication systems may be wireless or wireline and may carry voice and/or data.

In a two-way, multiple-access wireless communication system, communications between users are conducted through one or more base stations. In one example, one user on a first wireless mobile station communicates with another user on a second wireless mobile station by transmitting data on a reverse link to a base station. The base station receives the data and, if necessary, routes the data to another base station. Ultimately, the data is transmitted on a forward link of the final base station to the second mobile station. "Forward" link refers to transmission from a base station to a wireless mobile station and the "reverse" link refers to transmission from a wireless mobile station to a base station. In many communication systems, the forward link and the reverse link utilize separate frequencies.

Communications can also be conducted between one user on a wireless mobile station and another user on a landline station. In this case, a base station receives the data from the mobile station on a reverse link, and routes the data through a public switched telephone network (PSTN) to the landline station. Communications also occur in the opposite direction.

The foregoing wireless communication services are examples of "point-to-point" communication service. In contrast, "broadcast" services deliver information from a central station to multiple mobile stations ("multipoint"). The basic model of a broadcast system consists of a broadcast net of users served by one or more central stations, which transmit news, movies, sports, or other "content" to the users. Here, each mobile station monitors a common broadcast forward link signal. Because the central station fixedly determines the content, the users do not generally communicate back. Examples of common usage of broadcast services communication systems are television, radio, and the like. Such communication systems are usually highly specialized.

With recent advancements in wireless telephone systems, there has been growing interest in using the existing, chiefly point-to-point wireless telephone infrastructure to additionally deliver broadcast services. In this respect, a number of important advances have been made by QUALCOMM CORPORATION of San Diego, Calif. The following references (incorporated by reference) describe various QUALCOMM advances relating to the use of shared communications channels to deliver broadcast content in a wireless telephone network.

U.S. patent application Ser. No. 09/933,978, filed on Aug. 20, 2001 and entitled "METHOD AND APPARATUS FOR SIGNALLING IN BROADCAST COMMUNICATIONS SYSTEM."

U.S. patent application Ser. No. 10/192,132, filed on Jul. 9, 2002 and entitled "METHOD AND SYSTEM FOR MULTICAST SERVICE INITIATION IN A COMMUNICATION SYSTEM."

U.S. patent application Ser. No. 09/933,912, filed on Aug. 20, 2001 and entitled "METHOD AND SYSTEM FOR UTILIZATION OF AN OUTER DECODER IN A BROADCAST SERVICES COMMUNICATIONS SYSTEM."

U.S. patent application Ser. No. 09/933,971, filed on Aug. 20, 2001 and entitled "METHOD AND APPARATUS FOR OVERHEAD MESSAGING IN A WIRELESS COMMUNICATION SYSTEM."

The following references (also incorporated by reference) additionally describe various QUALCOMM advances relating to the use of dedicated (or dedicated and shared) communications channels to deliver broadcast content in a wireless telephone network.

U.S. patent application Ser. No. 10/356,053, filed Jan. 31, 2003 and entitled "METHOD AND APPARATUS TO INITIATE POINT-TO-POINT CALL DURING SHARED-CHANNEL DELIVERY OF BROADCAST CONTENT IN A WIRELESS TELEPHONE NETWORK."

U.S. patent application Ser. No. 10/278,516, filed Oct. 22, 2002 and entitled "METHOD AND APPARATUS FOR COMMENCING SHARED OR INDIVIDUAL TRANSMISSION OF BROADCAST CONTENT IN A WIRELESS TELEPHONE NETWORK."

U.S. patent application Ser. No. 10/278,485, filed Oct. 22, 2002 and entitled "METHOD AND APPARATUS FOR SWITCHING BETWEEN SHARED AND INDIVIDUAL

CHANNELS TO PROVIDE BROADCAST CONTENT SERVICES IN A WIRELESS TELEPHONE NETWORK."

Although the foregoing applications are satisfactory in many respects, one aspect of wireless broadcast systems that has not been fully developed is the means for counting mobile stations receiving broadcast content from a given cell site, base station, or other area.

SUMMARY

Broadly, this disclosure concerns wireless communication networks that provide broadcast content to mobile stations upon various shared and (optionally) individual broadcast channels. More particularly, the disclosure addresses various embodiments of method and/or apparatus to count mobile stations receiving specified broadcast content from a given base station.

The base station repeatedly broadcasts a message identifying at least one broadcast content stream and, in association with each stream, a REGISTER (R) or DO NOT REGISTER (DNR) indicator. Mobile stations receive and repeatedly examine contents of this message. When the indicator is R for a broadcast content stream, mobile stations whose users have elected to receive the stream send the base station a wireless registration message in association with that stream. When a count of registered mobile stations reaches a prescribed number, the base station configures the broadcast parameters message with a DNR indicator. When the indicator is DNR for a broadcast content stream, mobile stations refrain from transmitting any wireless registration message in association with that stream. The base station may institute a recount by resetting the indicator to R.

DETAILED DESCRIPTION

The nature, objectives, and advantages of the invention will become more apparent to those skilled in the art after considering the following detailed description in connection with the accompanying drawings.

Hardware Components & Interconnections

Wireless Communications System

Figure 1:
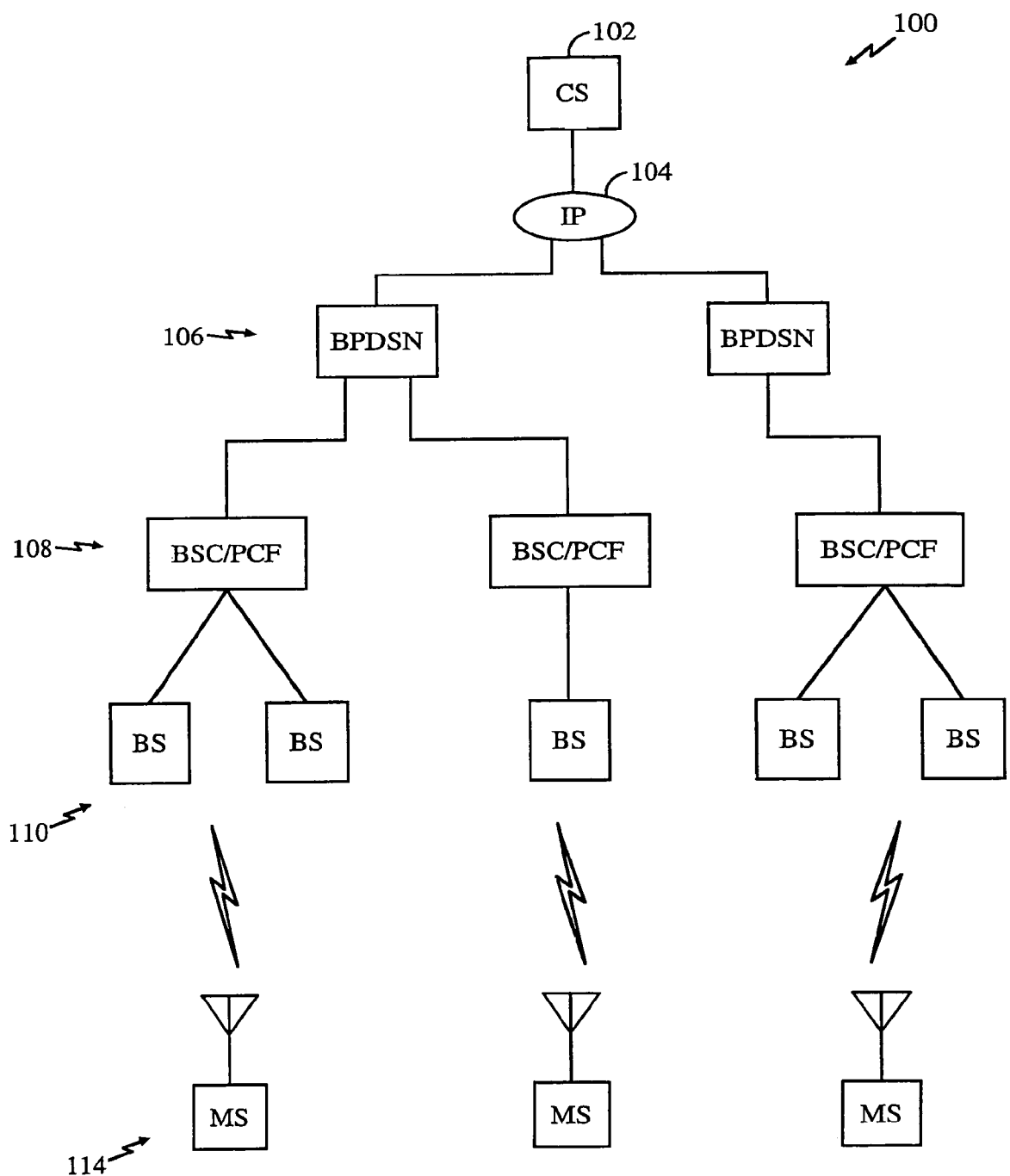
FIG. 1 is a block diagram of some hardware components and interconnections in a wireless communications network.

According to an exemplary model of a broadcast system, a number of mobile stations are served by one or more base stations that transmit broadcast content such as news, movies, sports events, and the like. FIG. 1 illustrates block diagram of a communication system 100, capable of performing high-speed broadcast service under various embodiments of the present disclosure.

For ease of illustration, and without any intended limitation, the subcomponents, interconnections, and overall arrangement of FIG. 1 utilizes the exemplary architecture of CDMA-2000. Nevertheless, the teachings of the present disclosure are similarly applicable to WCDMA, GSN, GPRS, EDGE, and other architectures. The adaptation of the present disclosure to other wireless network architectures will be apparent to ordinarily skilled artisans (having the benefit of this disclosure) without the necessity of illustrating components and protocols particular to those architectures.

Broadcast content originates at one or more content servers (CS) 102. The content server 102 comprises one or more digital data processing machines such as a personal computer, computer workstation, mainframe computer, computer network, microprocessor, or other computing facility to deliver packet-formatted (or other formatted) broadcast content to broadcast-packet-data-serving-nodes (BPDSN) 106 via Internet Protocol (IP) connection 104 or other (not shown) non-IP network or direct connection. Depending upon the manner of implementation, the nodes 106 may utilize the same or different hardware as packet data switching nodes (PDSNs) of the type that are well known in wireless telephony. According to each packet's destination, nodes 106 deliver the packet to an appropriate packet control function (PCF) module 108. Each module 108 controls various functions of base stations 110 related to delivery of high speed broadcast services. Among other functions, the modules 108 forward broadcast packets to the base stations 110. Each module 108 may utilize the same or different hardware as a base station controller (BSC) of the type that are well known in wireless telephony.

The base stations 110 deliver broadcast content and conventional wireless telephone calls to mobile stations (MSs) 114. The base stations 110 may be implemented using hardware such as that used by conventional base stations commercially used today.

Exemplary Digital Data Processing Apparatus

Data processing entities such as base stations, mobile stations, components 102, 106, 108, 110, 114, or any one or more of their subcomponents may be implemented in various forms. One example is a digital data processing apparatus, as exemplified by the hardware components and interconnections of the digital data processing apparatus 200 of FIG. 2.

The apparatus 200 includes a processor 202, such as a microprocessor, personal computer, workstation, controller, microcontroller, state machine, or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, flash PROM, one or more magnetic data storage disks such as a "hard drive", a tape drive, or any other suitable storage device. The apparatus 200 also includes an input/output 210, such as a line, bus, cable, electromagnetic link, interface, channel, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement various processing entities such as those mentioned above. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Wireless Telephone

Figure 4:
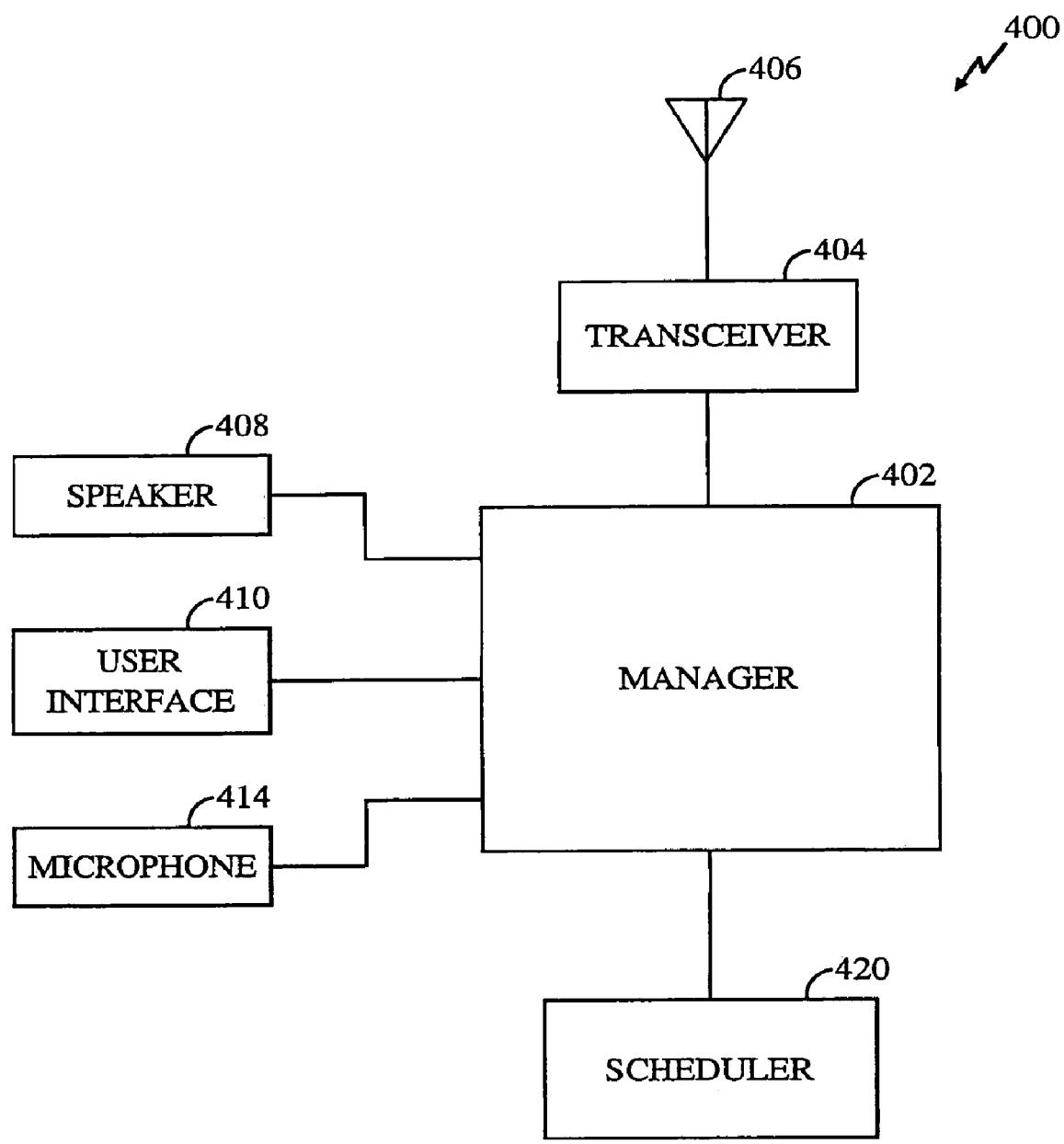
FIG. 4 is a block diagram of the hardware components and interconnections of a wireless mobile station.

FIG. 4 further illustrates the construction of an exemplary mobile station 114 by depicting a wireless telephone 400. The telephone 400 includes a speaker 408, user interface 410, microphone 414, transceiver 404, antenna 406, and manager 402, along with any other conventional circuitry that may vary depending upon the application. The manager 402, which may comprise circuitry such as that discussed in conjunction with FIG. 2 (above), serves to manage operation of the components 404, 408, 410, 414, 420, as well as signal routing between these components. The foregoing components may be implemented by subcomponents of various commercially available wireless telephones, for example.

Specific to the present disclosure is an added component, namely, a scheduler 420. As explained in greater detail below, the mobile utilizes the scheduler to trigger an evaluation event, namely for the mobile to consider whether re-registration is presently needed or not. The details of the evaluation event are discussed in greater detail below in conjunction with FIG. 7. The scheduler may provide its trigger on a periodic, non-periodic, event-driven, or other appropriate schedule. The scheduler 420 may comprise a timer, clock, counter, interrupt handler, software or firmware program or thread or subroutine, etc. Furthermore, in the case where the base station is providing multiple broadcast content streams, the scheduler may optionally activate at different times for different streams. In addition to internally stored or derived activation times, the scheduler may utilize activation times that are obtained, downloaded, gathered, or otherwise derived from an external source such as the BSPM. In the case of activation times derived from an external source, information from the external source may or may not relate to registration or evaluation events, as long as it contains some data appropriate to usefully derive activation times.

Although the wireless telephone 400 is illustrated, mobile station 114 may be mobile or stationary. Furthermore, a mobile station may comprise any data device that communicates through a wireless channel or through a wired channel, for example using fiber optic or coaxial cables. In addition to (or instead of) wireless and wireline phones, a mobile station may be configured to implement various other devices including but not limited to PC card, compact flash, external or internal modem, etc.

Operation

Having described various structural features, some operational aspects of the present disclosure are now described.

Signal-Bearing Media

Figure 2:
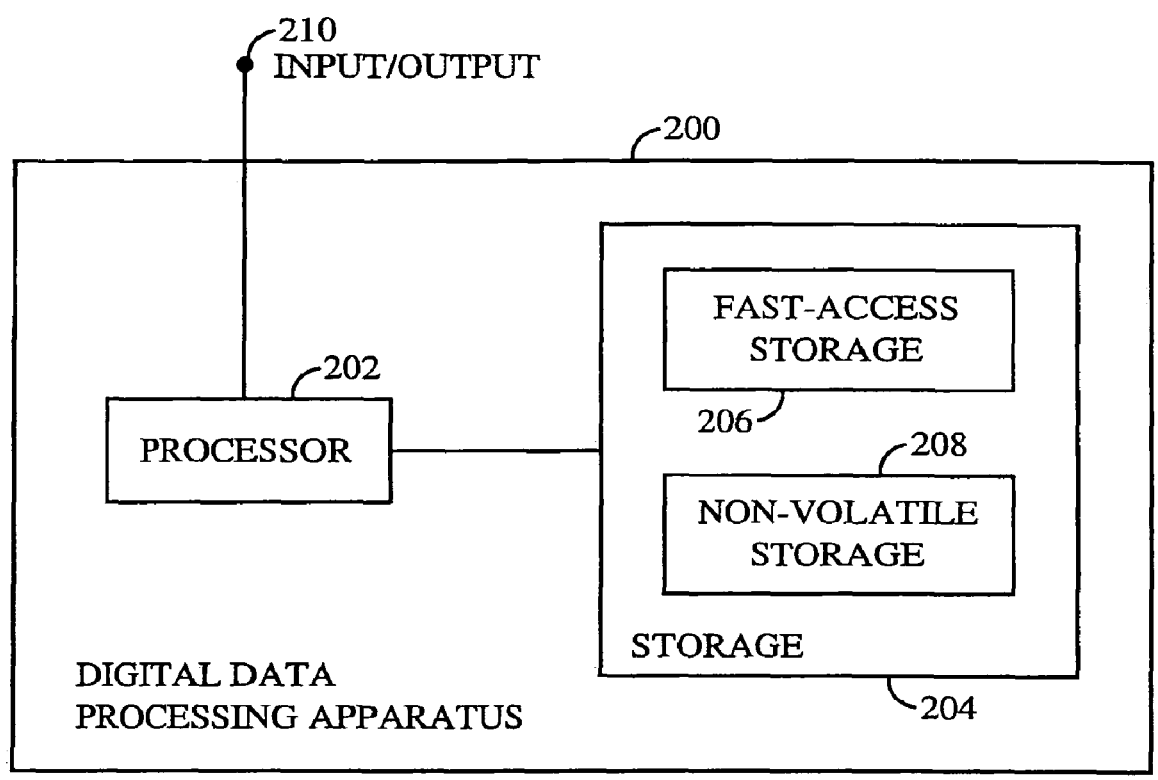
FIG. 2 is a block diagram of an exemplary digital data processing machine.
Figure 3:
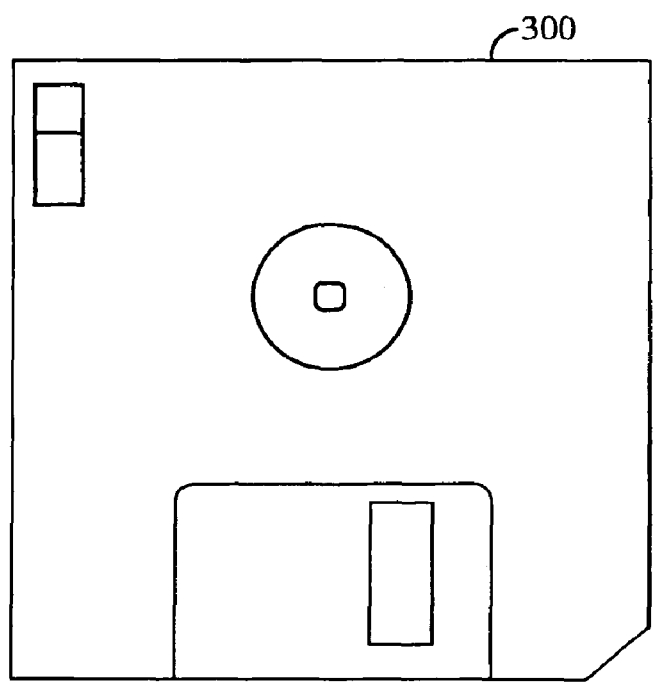
FIG. 3 is a plan view of an exemplary signal-bearing medium.

Wherever any functionality of the present disclosure is implemented using one or more machine-executed program sequences, such sequences may be embodied in various forms of signal-bearing media. In the context of FIG. 2, such a signal-bearing media may comprise, for example, the storage 204 or another signal-bearing media, such as a magnetic data storage diskette 300 (FIG. 3), directly or indirectly accessible by a processor 202. Whether contained in the storage 206, diskette 300, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic non-volatile memory (e.g., ROM, EPROM, flash PROM, or EEPROM), battery backup RAM, optical storage (e.g., CD-ROM, WORM, DVD, digital optical tape), or other suitable signal-bearing media including analog or digital transmission media and analog and communication links and wireless communications. In an illustrative embodiment of the invention, the machine-readable instructions may comprise software object code, compiled from a language such as assembly language, C, etc.

Logic Circuitry

In contrast to the signal-bearing medium discussed above, some or all of the present disclosure's functionality may be implemented using logic circuitry, instead of using a processor to execute instructions. Such logic circuitry is therefore configured to perform operations to carry out the method aspect of the invention. The logic circuitry may be implemented using many different types of circuitry, as discussed above.

Mobile Stations—Call Model

Figure 5A:
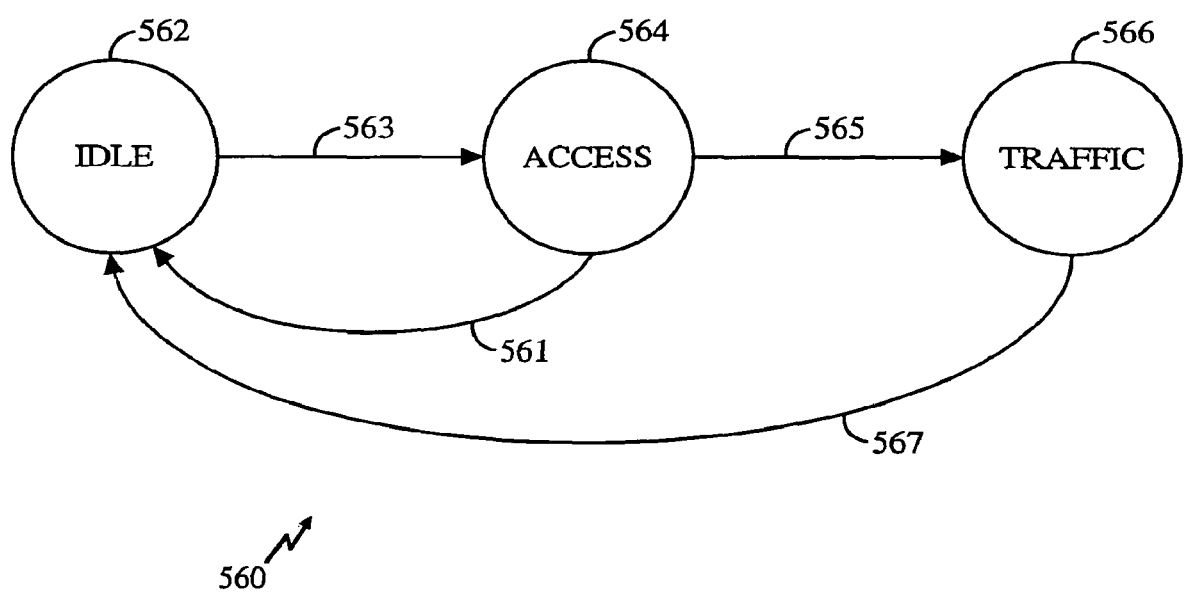
FIG. 5A is a state diagram illustrating the operational states of a mobile station.

Each mobile station 114 operates according to the state diagram 560 of FIG. 5A. In the IDLE state 562, the mobile station monitors a shared paging channel and a shared overhead channel, described in greater detail below. These channels are shared in the sense that every base station broadcasts these channels to all mobile stations in range. Briefly, the shared paging channel advises mobile stations of incoming calls and the shared overhead channel supplies various system related information. In the IDLE state 562, the mobile station may additionally receive multicast broadcast content from the base station via one or more shared broadcast channels. In the IDLE state 562, the mobile station's transmitter is turned off.

In one case, transition 563 from IDLE 562 to ACCESS 564 occurs when the mobile station sends a REGISTRATION message, advising nearby base stations of the mobile station's presence, identity, features, etc. In this case, the ACCESS state 564 transitions 561 back to IDLE 562 after the REGISTRATION message.

In another situation, transition 563 from IDLE 562 to ACCESS 564 occurs during the establishment of a point-to-point call, either by the mobile station or another party. As one example, if another party initiates the call, the mobile station receives a paging message over the common paging channel. After the mobile station answers the page on a common "access" channel, the mobile station receives assignment of a traffic channel on which to conduct the point-to-point call. The mobile station initiates an outgoing call by sending an appropriate message on the access channel, and then receiving channel assignment in the same manner.

Transition 565 from ACCESS 564 to TRAFFIC 566 occurs when an incoming or outgoing call goes through, and the mobile station and base station begin to communicate on the traffic channel. In the TRAFFIC state 566, the mobile station utilizes an individual traffic channel to conduct point-to-point communications with another party. The newly initiated point-to-point call may conduct voice, data, or even broadcast information as discussed below. If the point-to-point call carries broadcast content, then it substitutes for any shared broadcast that the mobile station was previously receiving in the IDLE state 562.

Transition 567 from the TRAFFIC 566 back to IDLE 562 occurs when the point-to-point call is terminated by either party or when the connection is otherwise broken. Transition 567 includes release of the traffic channel used to conduct the point-to-point call. If this point-to-point call contained broadcast content, then the transition 567 may optionally result in resumption of broadcast content delivery via shared channel in the IDLE state 562.

As discussed below, appropriately configured mobile stations (in the appropriate architecture of wireless network) may reside in the TRAFFIC state 566 with regard to one or more point-to-point calls, while separately and independently residing in the IDLE state 562 with regard to the receipt of one or more shared broadcast content streams via shared forward link channel.

Channels

FIGS. 5B-5E describe some of the primary communications channels used to relay information between mobile station and base station during the IDLE, ACCESS, and TRAFFIC states discussed above. The broadcast channels of the present disclosure may be utilized to relay data, audio, video, or any other desired content.

For ease of illustration, and without any intended limitation, the following discussion is made in the context of CDMA-2000. Nevertheless, these principles are similarly applicable to WCDMA, GSN, GPRS, EDGE, and other architectures. The adaptation of the present disclosure to other wireless network architectures will be apparent to ordinarily skilled artisans (having the benefit of this disclosure) without the necessity of illustrating components and protocols particular to those architectures. And, although various specific channels are given as an example, this disclosure may utilize other channels (that are known or become available in the future) without diverging from the invention.

"Communication channel/link" refers to a physical channel or a logical channel in accordance with the context. "Physical channel" means a communication route over which a signal propagates described in terms of modulation characteristics and coding. "Logical channel" means a communication route within the protocol layers of either the base station or the mobile station. "Reverse channel/link" means a communication channel/link through which the mobile station sends signals to the base station. "Forward channel/link" means a communication channel/link through which a base station sends signals to a mobile station.

IDLE State

Figure 5B:
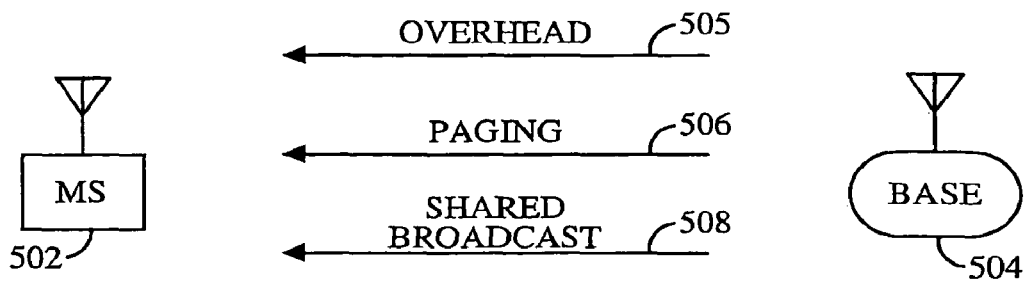
FIGS. 5B-5E are block diagrams illustrating messages exchange between mobile station and base stations during IDLE, ACCESS, TRAFFIC, and combination TRAFFIC/IDLE states, respectively.

FIG. 5B addresses the IDLE state 562. The base station 504 transmits the overhead channel 505 for receipt by the mobile station 502 as well as all other mobile stations being served by that base station. The overhead channel 505 contains periodically repeated system information, such as information about neighboring base stations, access information (e.g., recommended power levels, maximum message size, etc.), and system parameters (such as product revision levels, supported features, etc). In a CDMA-2000 system, the overhead channel 505 may comprise the forward broadcast control channel (F_BCCH).

As one example, contents of the overhead channel 505 may include a broadcast system parameters message (BSPM), which specifies each different broadcast channel and/or program that is "available" over shared and/or individual channels. The BSPM's indication that a program is "available" may mean that the program is presently being broadcast, that the program is planned for broadcast at a particular time in the future, the program is available to mobile stations on request but not being broadcast presently, or another meaning depending upon the desired implementation of the network. A "program" is a particular show, event, time period, or other unit of broadcast content, such as CNN news, or ESPN, or weather information, etc. The BSPM indicates which program is on each of the base station's shared channels (and the frequency or other channel identity), and which programs can be obtained on individual channels if available (with specific frequencies to be determined at the time of establishing service on the individual channel). The BSPM may also list certain other information, as described in greater detail below and/or various of the QUALCOMM patent references cited herein.

The base station 504 also transmits a shared paging channel 506 for receipt by all mobile stations being served by that base station. All mobile stations served by the base station 504 monitor the paging channel 506 so that they can be alerted upon arrival of a point-to-point call or other information for them. In CDMA-2000, the paging channel 506 is exemplified by the forward control channel (F_CCCH).

The shared broadcast channel 508 encompasses potentially many shared broadcast sub-channels (parallel channels) transmitted by the base station 504 for use by mobile stations in range of the base station. Broadly, the communication system 100 enables high-speed broadcast service by utilizing a "forward broadcast supplemental channel" (F_BSCH) capable of high data rates and suitable for receipt by a large number of mobile stations. The forward broadcast supplemental channel comprises, for example, a single forward link physical channel that carries broadcast traffic. One or more high-speed broadcast service channels are time-division-multiplexed within the single forward broadcast shared channel. Thus, the channel 508 may carry a number of different broadcast content streams concurrently.

The shared broadcast channels 508 may be freely available to all mobile stations, or limited to mobile stations that have completed certain enrollment (subscription) steps. Since the channel 508 is universally broadcast to all mobile stations within range, the mobile stations ultimately manage whether the user can access the broadcast or not based on whether the user has enrolled. As one example, each shared broadcast channel may be encrypted with a prescribed code, which is only provided to enrolled mobile stations.

A mechanism for enrollment to broadcast services is discussed in the following reference, the entirety of which is incorporated herein: U.S. patent application Ser. No. 09/934,021, filed on Aug. 20, 2002 and entitled "METHOD AND APPARATUS FOR OUT OF BAND TRANSMISSION OF BROADCAST SERVICE OPTION IN A WIRELESS COMMUNICATION SYSTEM."

ACCESS State

Figure 5C:
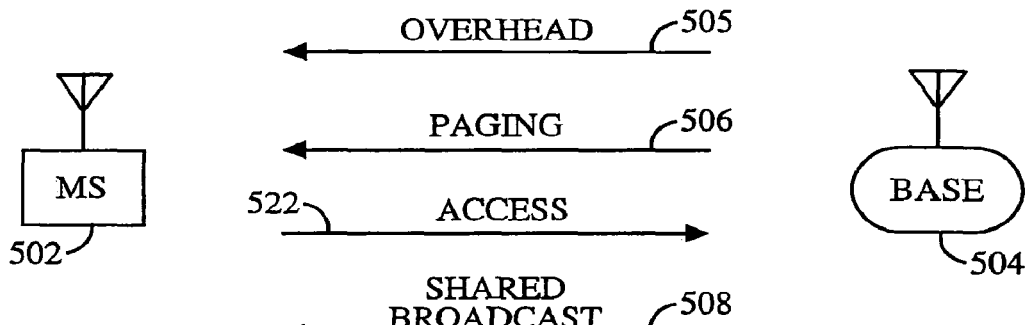

FIG. 5C addresses the ACCESS state 564. The mobile station 502 continues to receive the overhead 505, paging 506, and shared broadcast 508 channels. The shared access channel 522 is used by all mobile stations served by the base station 504. To begin a point-to-point call, the access channel 522 can be used in two ways. For incoming calls, the mobile station 502 uses the access channel 522 to answer a page when another station is initiating a point-to-point call to the mobile station 502. For outgoing calls, the mobile station 502 uses the access channel 522 to request initiation of a point-to-point call. In the CDMA-2000 protocol, the access channel 522 is exemplified by the reverse access channel (R_ACH). During the ACCESS state 564, the mobile station 502 may continue to monitor the shared broadcast 508.

Apart from point-to-point call initiation, the mobile station 502 may use the access channel 522 to occasionally transmit a REGISTRATION message. This serves to advise the wireless network of the mobile station 502's location, along with any other relevant information. In the event of REGISTRATION or other similar messages occurring in the ACCESS state 564, the mobile station 502 returns to IDLE 562 without entering the TRAFFIC state 566.

TRAFFIC State

Figure 5D:
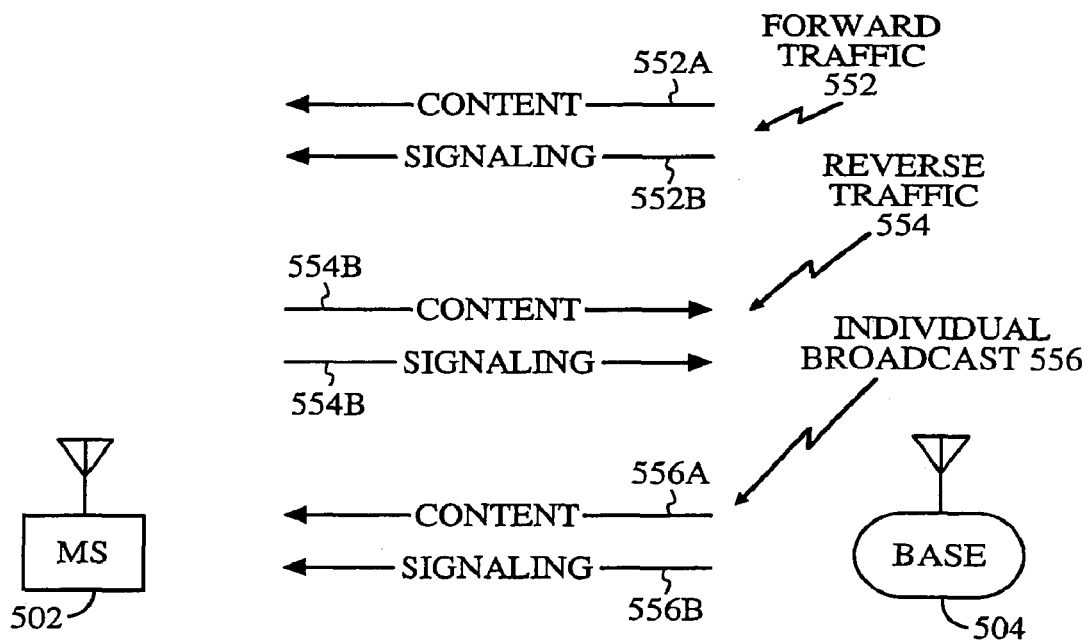

FIG. 5D addresses the TRAFFIC state 566. In this state, the traffic channels 552, 554 cooperatively conduct two-way point-to-point data calls between the mobile station 502 and base station 504. The channels 552, 554 are dedicated channels for individual use of the mobile station 502. The forward traffic channel 552, a "logical" channel, includes parallel physical channels such as the traffic-content channel 552a and the traffic-signaling channel 552b. The traffic-content channel 552a carries content, such as the voice information or data conveyed from the base 504 to the mobile station 502. The traffic-signaling channel 552b carries signaling information such as housekeeping, metadata, system information, and other information that describes the channel 552a and/or its content. In an alternative embodiment, the channels 552a, 552b may be unrelated, rather than being parallel channels as described. The reverse traffic channel 554 also includes parallel traffic-content and signaling channels 554a, 554b, conducting communications in the opposite direction of the channel 552.

In the TRAFFIC state, the mobile station does not use the access 522, overhead 505, or paging channels 506, since this information is conveyed on the dedicated signaling channels 552b, 554b instead.

During TRAFFIC 566, the mobile station 502 may continue to receive broadcast content. However, with some known hardware, delivery of broadcast content concurrently with a point-to-point call 552/554 is necessarily conducted on an individual, point-to-point channel 556 rather than the shared channel 508. This is chiefly because the signaling and control procedures that are required for proper operation of mobile station are vastly different in IDLE versus TRAFFIC channels, and hardware limited mobile stations can only be in one of these two states at any given time. Therefore, while traffic channels 552, 554 are in use, the exchange of any broadcast content during this time necessarily occurs on a traffic channel 556, with content occurring on 556a and signaling on 556b.

Generally, any forward link channel suitable for point-to-point calls may be used for the individual broadcast channel 556. Several more specific options are presented as follows. One option, using CDMA-2000 as an example, is the forward fundamental channel (F_FCH) or forward dedicated control channel (F_DCCH), which provide 14.4 Kb/s. Another option is the forward supplemental channel (F_SCH), which provides up to 1 Mb/s. A still faster option is the forward packet data channel (F_PDCH), which provides still faster service up to 2.4 Mb/s.

Unlike the IDLE 562 and ACCESS 564 states, where the mobile station 502 only communicates with a single base station, the mobile station 502 in TRAFFIC may concurrently exchange traffic and broadcast content and signaling information with multiple base stations in order to effect a soft handoff (in the case of a CDMA air interface) to obtain signal redundancy, or to achieve other goals. Therefore, ordinarily skilled artisans (having the benefit of this disclosure) will recognize that the present disclosure's references to "base station" (in the singular) are made for brevity and ease of discussion. Mobile stations in TRAFFIC utilizing a CDMA air interface may communicate with multiple base stations concurrently.

In addition, techniques are known for the mobile station 502 to conduct multiple two-way telephone conversations simultaneously on traffic channels 552, 554. These techniques involve, for example, time multiplexing different data streams so that a given channel can carry more than one. Utilizing similar technology, the present disclosure contemplates the mobile station 502 receiving multiple, concurrent broadcast programs on the individual channel 556.

TRAFFIC & Simultaneous Shared Broadcast State

Figure 5E:
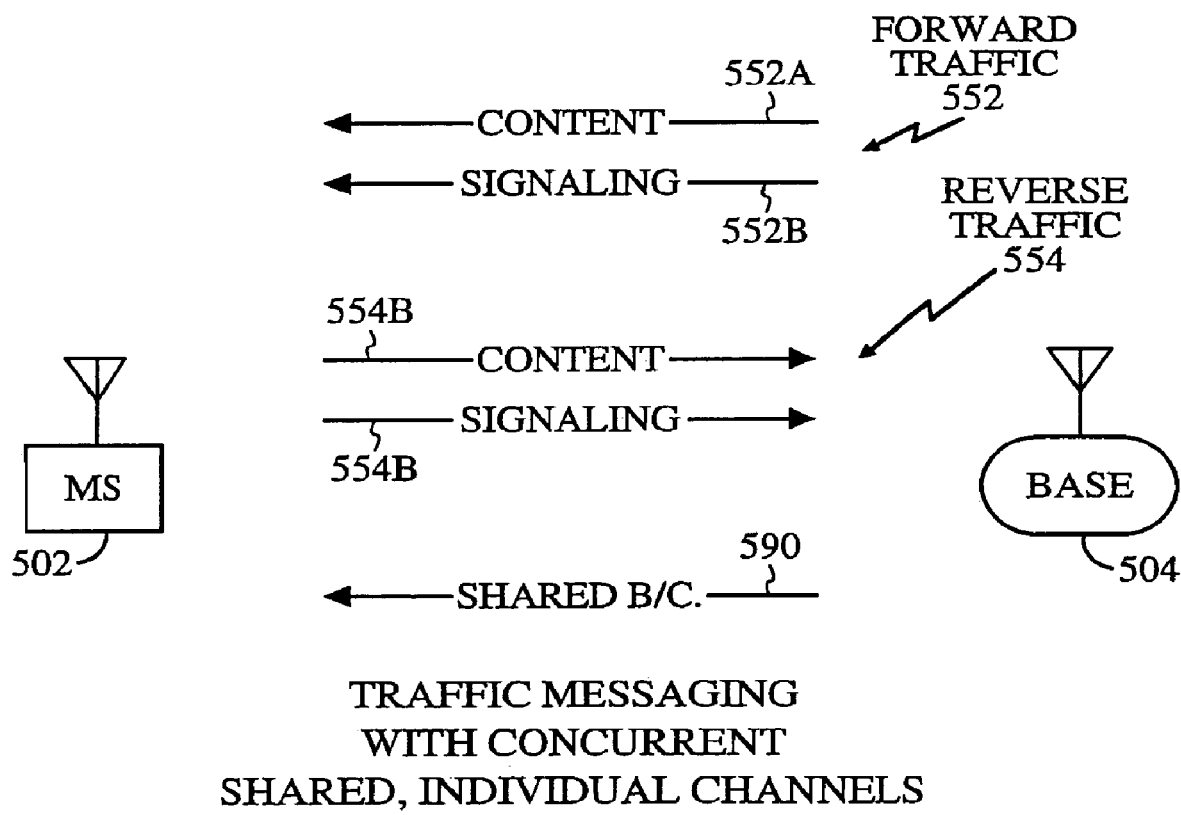

FIG. 5E addresses an additional state which includes TRAFFIC (such as FIG. 5D) along concurrent delivery of a shared broadcast to the mobile station 502 (as in FIG. 5A). This communications state is utilized under certain known designs of wireless network architectures, and only in cases where the mobile station 502 includes appropriate circuitry to conduct a two-way point-to-point call on the channels 552/554 while receiving the shared broadcast on a different channel 590. The mobile station 502 must also be able to participate concurrently in TRAFFIC state signaling and control procedures (with respect to the channels 552/554) and while conducting IDLE state signaling and control procedures (with respect to the channel 590).

As mentioned above, known techniques may also be utilized for the mobile station 502 to conduct multiple two-way telephone conversations simultaneously on traffic channels 552, 554. These techniques involve, for example, time multiplexing different data streams so that a given channel can carry more than one. Utilizing similar technology, the present disclosure contemplates the mobile station 502 concurrently receiving one or more broadcast programs on individual channels 552, conducting one or more point-to-point calls on the individual channels 552/554, and concurrently receiving one or more broadcast programs on the shared channel 590.

Further Information

The physical and logical channels used in high speed broadcast services are discussed in greater detail in the following references, the entireties of which are incorporated herein by reference: (1) CDMA 2000 Physical Layer Standard, known as IS_2000.2, (2) U.S. patent application Ser. No. 09/933,978, filed Aug. 20, 2001 and entitled "METHOD AND APPARATUS FOR SIGNALING IN BROADCAST COMMUNICATION SYSTEM." The use of common and dedicated channels for information broadcast is disclosed in the following reference, the entirety of which is incorporated herein by reference: U.S. Patent Application No. 60/279,970, filed Mar. 28, 2001 and entitled "METHOD AND APPARATUS FOR GROUP CALLS USING DEDICATED AND COMMON CHANNELS IN WIRELESS NETWORKS."

BSPM

As mentioned above, each broadcast-capable base station repeatedly broadcasts a representative BSPM over the overhead channel 505 to advise mobile stations of that base station's available broadcast content and related information.

One component of the BSPM is the "registration indicator," which has a value of REGISTER (R) or DO NOT REGISTER (DNR). The registration indicator may be implemented as a flag, bit, code, message header, or other signal or metadata. In one embodiment, a base station's BSPM includes a single registration indicator, which is applies to all broadcast content of that base station. In another embodiment, the base station's registration indicator only applies to a select items of broadcast content, with the remainder being conducted without regard to registration. Under a still different approach, which is illustrated in the remaining discussion below, a base station's BSPM includes a different registration indicator for each different broadcast content stream (e.g., broadcast channel, broadcast program, etc.) of that base station. The broadcast content stream corresponding to a registration indicator may be identified by a number, alphanumeric text, or other code. If the registration indicator for a specified broadcast content stream is set to R, this instructs mobile stations to register if they are receiving or commencing receipt of the specified broadcast content stream. Similarly, if the registration indicator for a specified broadcast content stream is set to DNR, this instructs subscriber stations to refrain from registering. The registration indicator and its use are discussed in greater detail below.

Also in association with each broadcast content stream, the BSPM may optionally provide a "registration wait factor." The registration wait factor guides mobile stations in determining how much of a delay to institute before registering, in order to avoid system overload by all mobiles trying to register simultaneously. The content and use of the wait factor is described in greater detail below.

In addition to the registration indicator, the BSPM may include further information such as (1) information identifying and/or explaining the channel content, i.e., subject broadcast program, (2) whether the subject program is "available" via individual channel (whether the base station is programmed, configured, or otherwise equipped with the ability to provide the subject program on individual channels, or whether the subject program is being broadcast presently), (3) whether the subject program is "available" via shared channel from the base station, (4) characteristics of the shared channel used to broadcast the subject program, which may depend upon the air interface that is implemented, with some examples being Walsh code, modulation type, Viterbi coding, data rate, error correction, and the like, (5) identity of the shared channel (if applicable) used to broadcast the subject program, namely, the logical frequency and/or physical bandwidth used by the subject base station.

The BSPM may be expanded to include a variety of other information, and likewise abbreviated to leave out certain information listed above. For example, the base station may omit certain information and instead provide the information upon demand, to shorten the BSPM and save bandwidth on the overhead channel 505.

Network Operations

Figure 6:
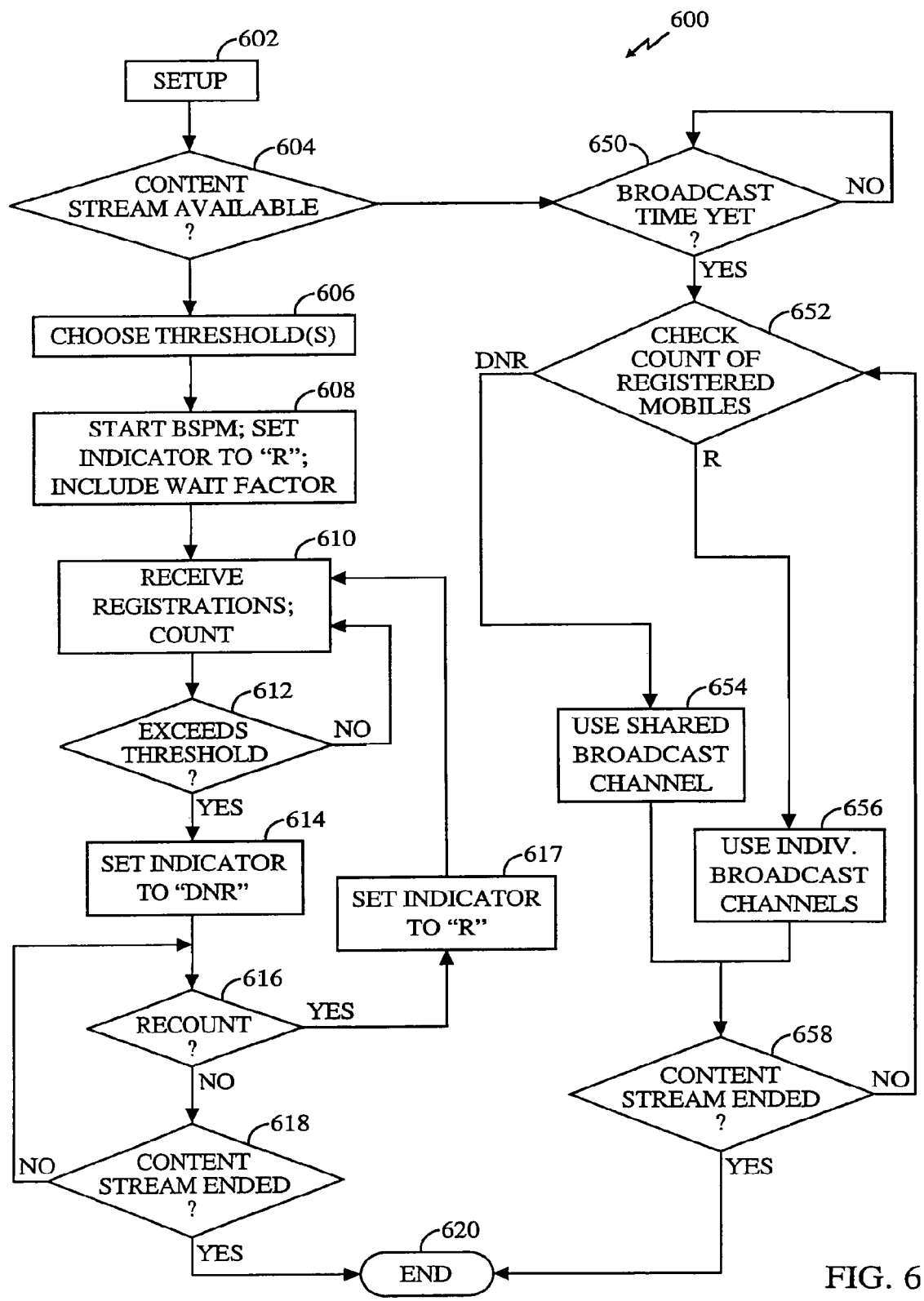
FIG. 6 is a flowchart illustrating base station operations to track a count of mobile stations receiving specified broadcast content from the base station.

FIG. 6 depicts overall operations 600 performed by the wireless communications network to count wireless mobile stations receiving broadcast content via multi-user forward link broadcast channel of a base station. For ease of description, without any intended limitation, the sequence 600 is described in conjunction the components of FIGS. 1-5E as discussed above.

In step 602, the network 100 performs various setup functions, such as establishing subscriptions of various mobile stations to various broadcast content. A subscription may be held by a mobile station, user, or other entity, and pertains to one or more broadcast channels, broadcast programs, or other specific broadcast unit(s). In one example, subscriptions arrangements are completed "online" by the network interacting with the mobile stations themselves (via SMS, telephone voice menu, human user, or other means). In another example, subscription arrangements are completed "offline" (with respect to the wireless network 100) via web site, telephone operator, mail, or another non-network interface, in which case the results, status, and other subscription information are appropriately forwarded to the network.

The remaining steps 604-658 are independently performed by one or more base stations 110 in the network 100. As one example, all base stations 110 in the network 100 may independently perform the steps 604-658. As a different example, only those base stations appropriately programmed, upgraded, or otherwise deployed may perform the steps 604-658, with the remaining base stations not participating. For ease of reference, the remaining discussion of steps 604-658 is made in the context of actions by one representative or "subject" base station.

In step 604, the subject base station learns that a specified broadcast content stream is or will soon be available from the content server 102. Step 604 may occur by notification from the content server 102 ("push"), base station inquiry of the content server ("pull"), or another means. The subject broadcast content "stream" may comprise a broadcast program (like an individual television or radio show), a broadcast channel (such as CNN, ESPN, and the like), or other broadcast unit. For ease of explanation, without any intended limitation, the following discussion exemplifies the broadcast content stream as a single broadcast program. Furthermore, without any intended limitation, the following discussion describes the case where the subject base station receives or obtains notice in step 604 that the specified broadcast content stream from the content server 102 will commence in the future at a prescribed time. The subject broadcast program may be "available" from the content server 102 in that it is planned for future broadcast at a particular time, presently being received from the content server 102, or another definition depending upon the desired implementation in the network 100.

After step 604, steps 650-658 start and thereafter manage transmission of the subject broadcast content stream. Steps 606-618 oversee the registration process and counting of registered mobile stations.

Referring to steps 606-618 more specifically, in step 606 the subject base station selects a threshold for future use in counting mobile stations receiving the subject broadcast program. Basically, when the number of mobile stations exceeds the threshold, the base station stops counting. The threshold is chosen based on the purpose for which it is used, that is, the reason for counting mobile stations registrations. In the illustrated example, without any intended limitation, the count of mobile stations is used to determine whether to provide the subject broadcast program on a shared or dedicated channel. A shared channel is only used when the number of mobiles exceeds the threshold, thereby conserving broadcast power. Dedicated channels are used when the number of mobiles is at the threshold number or less, thereby conserving broadcast power (among other factors) due to the availability of power controlled individual channels. In the illustrated example, then, the threshold is selected according to the details of the radio interface, and particular, the relative efficiencies (as implemented) of shared versus dedicated channels.

Having chosen the threshold in step 606, step 608 is then performed. In step 608, the subject base station begins repeatedly transmitting the BSPM with registration indicator set to R in association with the subject broadcast program. If the BSPM is already being broadcast, presumably due to the preexisting availability of other broadcast programs, the base station in step 608 amends the BSPM to include the registration indicator R in association with the subject broadcast program. In either case, the BSPM may identifies the broadcast program as specifically as necessary.

Optionally, the BSPM may also include a "registration wait factor" as mentioned above. Broadly, the registration wait factor guides mobile stations in determining how much of a delay to institute before registering, in order to avoid system overload by all mobiles trying to register simultaneously. In one example, the wait factor may prescribe a given maximum wait, where each mobile station conditions the maximum based upon a predetermined algorithm to arrive at a wait between zero and the maximum; in another example, the wait factor prescribes an average wait of an experimental, Gaussian, geometric, normal, or other known distribution. This spreads the mobile stations' registration times to avoid base station overload. In another example, the wait factor may be omitted or set to zero to institute no wait. The content and use of the wait factor is described in greater detail below in conjunction with FIG. 7.

In step 610, the base station receives one or more registrations, that is, a prescribed format of wireless registration message sent by mobile stations. As explained in greater detail below, the registering mobile stations are those that are receiving or commencing receipt of the subject broadcast program from the base station. Also in step 610, the base station counts the registrations. In a simplified embodiment, the base station counts all registration messages received from the mobile stations.

In a more sophisticated embodiment, the base station only counts valid registration messages received from the mobiles. As explained in greater detail below (FIG. 7), the mobile in this embodiment utilizes a prescribed format of registration message including some of all of these components: (1) a code, format, layout, header, or other information signifying that this is a registration message, as opposed to another type, (2) a code to distinctively identify the mobile station, so that the base station can verify that the mobile station has truly subscribed to the broadcast content (e.g., a known code such as an ESN, IMSI, TMSI, P-TMSI, etc.), (3) a code identifying the desired broadcast content stream for which registration is sought. Optionally, the registration message may further include security parameters, such as one or more of the following: (1) a digital signature or other subscriber identification code for the base station to validate the identity of the mobile station and/or subscriber, (2) a message authentication code to prove to the base station that the registration message has not been modified after transmission (for example, a code computed based on the message content and an integrity key), (3) a crypto sync such as a monotonically increasing counter that is reset when the mobile station performs a new authentication, used to protect against repetition attacks where an eavesdropper intercepts a valid message and transmits it over and over to disrupt the system.

Therefore, in this example, step 610 involves the base station determining whether each received registrations are valid and, only if valid, counting it. To be valid, the registration message must include appropriate content purporting to be a registration message, identify a recognized mobile station, and properly identify the desired broadcast content stream. Furthermore, if security provisions are implemented, the base station conditions registration validity upon one or more of the following: (1) valid digital signature or subscriber identification code, (2) the base station's recomputing of the message authentication code based on the message contents and to determine whether the mobile's submitted message authentication code is proper, (3) verification that the message has a distinct crypto sync with respect to any other registration messages from the same mobile station.

Therefore, in step 610 the base station counts valid registrations. In the present example, the base station's actions in step 610 serve to collect registrations for an upcoming broadcast content stream that is expected to arrive from the content server at some future time. Thus, the base station by performing step 610 gauges the popularity of the upcoming program. Separate acts of the base station start transmission of the broadcast content stream from the content server at the appointed time and thereafter manage broadcast transmission (as explained below in conjunction with steps 650-658).

In step 612, the base station asks whether the number of registered mobile stations (for the subject broadcast program) exceeds the threshold that was established in step 606. In addition to counting the registered mobile stations (receiving the broadcast content stream on shared channel), the count of step 612 may additionally include any unregistered mobile stations receiving the broadcast stream on individual channels. For these mobiles, registration is not necessary since the base station already knows that they are receiving the subject broadcast content stream due to the call setup on individual channels.

If the count does not exceed the threshold, step 612 returns to step 610 to log more registrations. When the number of registered mobile stations reaches the threshold, step 612 advances to step 614. In step 614, the base station reconfigures the BSPM's registration indicator as "DNR" for the subject broadcast program. Utilizing DNR at this point can significantly reduce access channel traffic and other network load, since new participants in the broadcast will not engage the base station in the registration process. This also eases the process of joining for late participants, since they need not register.

In step 616, the base station asks whether circumstances justify a recount of mobile stations presently receiving the subject broadcast. The base station may be programmed to recognize any desired conditions for recount. In one example, a recount may be performed periodically; furthermore, the recount interval may vary depending upon the bandwidth of the subject broadcast, available system resources, and other such factors. For example, a recount may be performed every one or two minutes for high data rate programming, and every ten or thirty minutes for low bandwidth content. In another example, recount may be performed whenever there is a prescribed change in broadcast content, for example, a change in the data rate, quality of service, bit error rate, or other characteristic.

If step 616 finds that a recount is warranted, step 616 advances to step 617, where the base station returns the registration indicator to R, in order to resume collecting registrations for the subject broadcast program. At this point, the count of registered mobiles is reset to zero. Step 617 then advances to step 610 to collect registrations. Otherwise, if no recount is warranted, step 616 goes to step 618. In step 618 the subject base station checks to see whether the subject broadcast program has ended. Examples of this include the natural completion of a given broadcast program, loss of the broadcast stream from the content server 102, end of radio transmission, arrival of the broadcast content stream's scheduled end time, etc. If the broadcast program has ended, the routine 600 ends in step 620. Otherwise, if the broadcast content stream continues, step 618 returns to step 616, which repeats as discussed above.

As mentioned above, the base station may provide one or multiple broadcast channels. Accordingly, the BSPM may list one or multiple shared broadcast content streams and one registration indicator associated with each different stream. For ease of illustration, the sequence 600 has been discussed in the context of one subject broadcast content stream. The base station, however, repeats the steps 604-620 for each different broadcast content stream, thereby separately tracking the count of registered mobile stations for each stream.

Steps 606-618, then, oversee the registration process and counting of registered mobile stations. In contrast, steps 650-658 start and thereafter manage transmission of the subject broadcast content stream. Referring to steps 650-658 more specifically, step 650 asks whether the appointed time has arrived for start of the subject broadcast content stream. When this time comes, step 650 proceeds to step 652, where the base station checks the count of mobile stations registered to receive the subject program. As illustrated, this is conveniently achieved by checking whether the registration indicator is set to R or DNR since this depends directly on whether the threshold has been met or not. If the indicator is set to R, the number of registered mobiles is small, so the base station begins broadcasting the subject broadcast content stream to the mobiles on individual channels (step 656). If the indicator is set to DNR, the number of registered mobiles is large, so the base station begins broadcasting the subject broadcast content stream on a single forward link shared channel (step 654).

After step 654 or 656, the base station checks whether the content stream has ended, and if so, the sequence ends in step 620. Otherwise, if the content stream is still continuing, step 658 returns to step 652 to recheck the number of registered mobile stations. In this way, the base station preserves efficiency by utilizing the most appropriate channel type. Although not shown, the sequence 600 may be modified (as will be apparent to ordinarily skilled artisans having the benefit of this disclosure) to utilize hysteresis or other means to prevent thrashing between states 654, 656 when the number of registered mobile stations fluctuates above and below the threshold.

Delivery of broadcast program on individual and shared channels is discussed in greater detail in various U.S. patent applications assigned to QUALCOMM CORPORATION, including one or more of the QUALCOMM patent applications specifically identified above.

Mobile Station Operations

Figure 7:
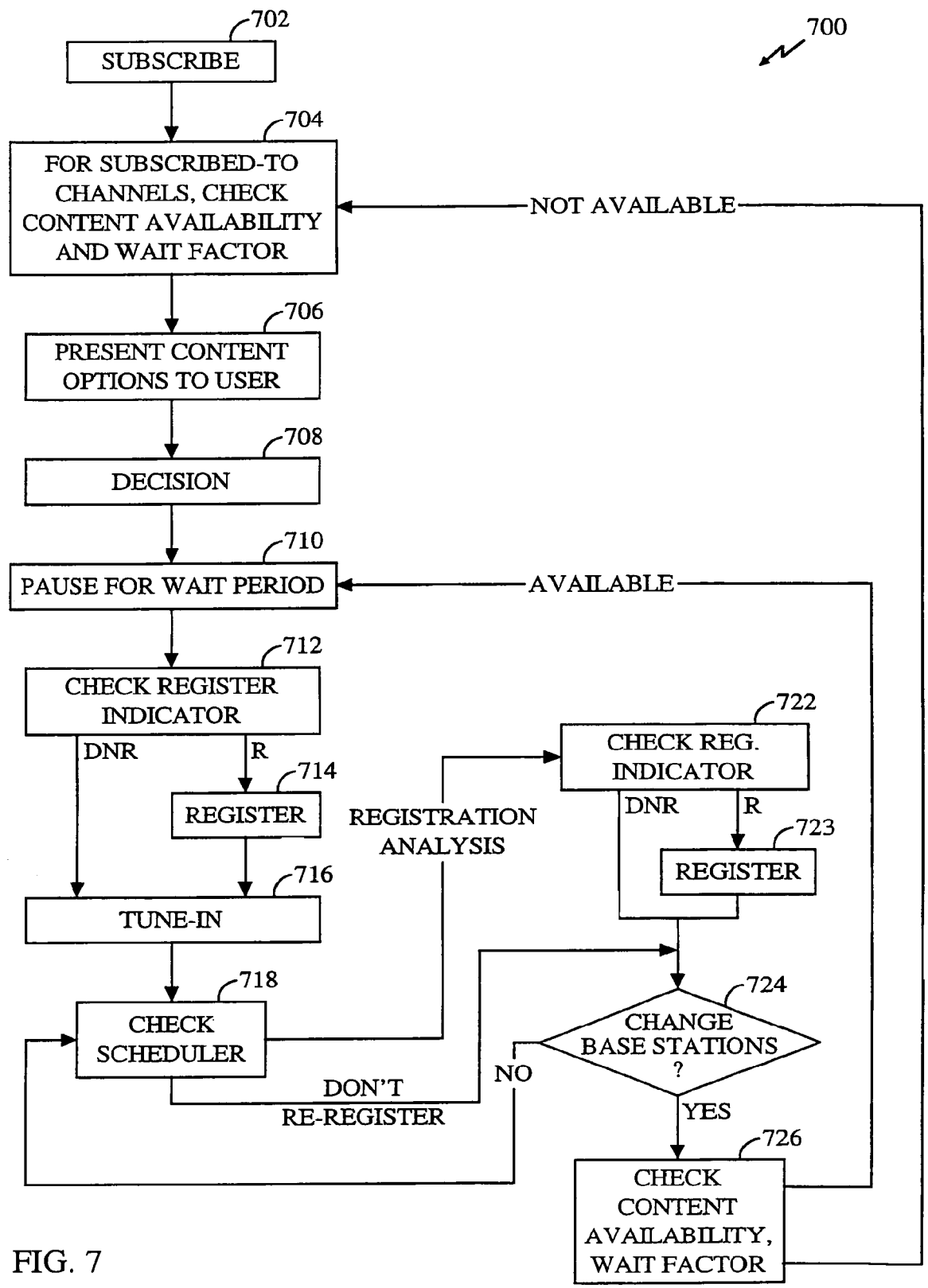
FIG. 7 is a flowchart illustrating mobile station operations to receive and selectively register for receipt of broadcast content in a wireless communications network.

FIG. 7 depicts operations 700 performed by a mobile station to engage in receipt of broadcast content from a base station, including steps to cooperate with the base station's scheme for tracking/counting mobile station receipt of a given broadcast content. For ease of description, without any intended limitation, the sequence 700 is described in conjunction the components of FIGS. 1-5E as discussed above, in the context of a subject mobile station.

In step 702, the subject mobile station subscribes to one or more broadcast content streams, such as broadcast channels and/or programs. The subscription mechanism is detailed above, and may be performed offline by the user without involving the mobile station, or alternatively online. As with the sequence 600 above, the subject broadcast content stream may comprise a broadcast program (like an individual television or radio show), a broadcast channel (such as CNN, ESPN, and the like), or other broadcast unit. For ease of explanation, without any intended limitation, the following discussion of sequence 700 exemplifies the broadcast content stream as a single broadcast program ("subject" broadcast program).

In step 704, the mobile station checks whether content of the subscribed-to broadcast programs is available from the mobile's "serving" or other primary base station, for instance, by reading the serving base station's BSPM. This step may be performed automatically by the mobile station, or upon user demand. If performed automatically, the mobile repeats this step on a periodic, non-periodic, or other advantageous schedule. Also in step 704, the mobile station reads the BSPM to determine the applicable registration wait factor for each subscribed-to broadcast program, as discussed in greater detail below.

In step 706, the mobile station presents content options to the user. Namely, the mobile station presents audio and/or video information to the mobile station user, this information listing the available broadcast programs. This may be performed on a "push" or "pull" basis. Examples of "push" technology involve the mobile station proactively alerting the user to content availability by activating the mobile station as a pager, ringing the mobile station, showing a visual icon, or other alert and then visually or auditorily presenting the content options to the user. An example of "pull" technology is where the mobile station waits for the user to request content availability information, and then presents such information to the user on demand.

In step 708, the mobile station receives a decision as to a desired broadcast program. For instance, the user may select the desired program by making a keypad entry, voice command, etc. Responsive to the decision of step 708, the mobile station in step 710 applies a predetermined algorithm to the registration wait factor to compute a conditioned wait factor, which is an actual time delay. Then the mobile station waits (step 710) for this period before checking whether registration is necessary and registering if appropriate.

As mentioned above, the registration wait factor guides mobile stations in determining how much of a delay to institute before registering, in order to avoid system overload by all mobiles trying to register simultaneously. In one example, the wait factor comprises the maximum wait period, and each mobile conditions the wait factor by a specified reduction algorithm to arrive at an actual time delay. One example is where the mobile station generates a random number between zero and one, and multiples the wait factor by this number to arrive at the actual time delay. Another example is where the mobile station reads restriction information from the BSPM or other broadcast information and uses this to determine whether it is allowed to register or not, based on the access class, ESN, or other assigned code of the subscriber. In other words, the mobile pauses until the BSPM indicates that registration is permitted for the subject mobile or a class that includes this mobile.

In another example, the wait factor may be internally derived from a clock, counter, timer, lookup table, computational algorithm, ESN, mobile ID, or other data available to the mobile station without external input. In another example, the wait factor may be derived from external information unrelated to registration and, perhaps, unintended for use in developing a wait factor, yet useful to institute variable wait factors for different mobile stations. Some examples include the calendar date, base station ID, universal time, or any other useful code, message, number, pattern, or construct.

At any rate, the foregoing examples ensure that some mobile stations will wait for longer periods and others will wait for shorter periods, thereby avoiding registration overload. For ease of explanation, further discussion is limited to the wait factor obtained from the base station via the BSPM.

Since the conditioned wait factor is used by mobiles as a pre-registration delay, the wait factor therefore enables the base station to spread mobile station registrations out over a selected period of time. For broadcast content with expected high popularity, and for base stations that cover a large number of potential users, the base station may specify a longer wait factor (such as sixty seconds), which will spread mobile registrations over a period from zero (when the broadcast content first becomes available) to the length of the full wait factor. For less popular broadcast content, the base station may specify a shorter wait factor, or even zero.

After waiting in step 710, the mobile station again checks (712) the BSPM to determine whether the registration indicator for the desired broadcast content stream is set to R or DNR, to avoid an unnecessary registration. If R, the mobile station registers in step 714 by sending a prescribed format of wireless registration message. For its registration, the mobile station utilizes a channel pre-assigned for this purpose, such as the reverse access channel (R-ACCH) under CDMA-2000 architecture.

Although different configurations may be used, an exemplary registration message contains a number of parts. First, the message contains a code, format, layout, header, or other information signifying that this is a registration message, as opposed to another type. Second, the message contains a code to distinctively identify the mobile station, so that the base station can verify that this particular mobile station has in fact subscribed to the broadcast content. This code, for example, may comprise a known code such as an ESN, IMSI, TMSI, P-TMSI, etc. Third, the registration message contains a code identifying the desired broadcast program for which registration is sought. Optionally, the registration message may further include security parameters, such as one or more of the following: (1) a digital signature or other subscriber identification code for the base station to validate the identity of the mobile station and/or subscriber, (2) a message authentication code to prove to the base station that the registration message has not been modified after transmission (for example, a code computed based on the message content and an integrity key), (3) a crypto sync such as a monotonically increasing counter that is reset when the mobile station performs a new authentication, used to protect against repetition attacks where an eavesdropper intercepts a valid message and transmits it over and over to disrupt the system.

If the BSPM shows DNR for the desired broadcast content stream, the mobile skips step 714. After step 712 (DNR) or step 714 (R), the mobile station adjusts its transceiver and/or other applicable circuitry to begin receiving the broadcast content stream.

In step 718, while continuing to receive the subject broadcast program the mobile station checks whether the scheduler 420 has triggered an evaluation event (to examine whether re-registration analysis must be conducted). If the scheduler 420 is implemented as a timer, for example, the timer's expiration signals that it is time to perform re-registration analysis and re-register if appropriate. Optionally, when implemented as a countdown timer, the scheduler may utilize a variable countdown time. For instance, the registration wait factor obtained in step 704 may also be used to provide a variable re-registration countdown or derive such a variable number. Alternatively, the scheduler 420 may institute a hardware interrupt when re-registration should be evaluated.

If the re-registration is not required, the mobile station continues receiving the desired broadcast content stream, and checks to see whether the mobile has changed base stations (step 724). If the mobile station has changed base stations, re-registration may be needed, as discussed in greater detail below.

If the scheduler 520 has experienced an evaluation event (step 718), the mobile station performs its re-registration analysis while continuing to receive the subject broadcast program. Namely, the mobile checks the base station's current BSPM to see whether the registration indicator for the desired broadcast content stream is set to R or DNR (step 722). If R, the mobile station re-registers in step 723 by sending the prescribed format of wireless registration message to the base station. If the BSPM shows DNR for the desired broadcast program, the mobile skips step 723. After step 722 (DNR) or step 723 (R), the mobile station checks to see whether the mobile has changed base stations (step 724). This may be performed, for example, by determining whether the identity of the mobile's serving base station has changed.

If the mobile has changed base stations, step 724 advances to step 726. In step 726, the mobile monitors the new base station's BSPM to check for availability of the desired broadcast program at the new base station and the program's associated registration wait factor. If the same broadcast program is available from the new base station, step 726 returns to step 710 which commences the registration process at the new base station. If the desired broadcast program is not available, step 726 returns to step 704 to fully assess content availability at the new base station and thereafter (706) present the updated options to the user.

Other Embodiments

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

Moreover, the previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The word "exemplary" is used herein to mean "serving as an example, instance, or illustration." Any embodiment described herein as "exemplary" is not necessarily to be construed as preferred or advantageous over other embodiments.

The invention claimed is:

1. A method of operating a wireless mobile station, comprising:
   receiving wireless transmission of a broadcast parameters message from a base station, the message including an identity of at least one broadcast content stream and, in association with each broadcast content stream, an indicator having one of the following values: REGISTER, DO NOT REGISTER;
   examining contents of the broadcast parameters message;
   responsive to conditions including the examination revealing that the indicator is set to REGISTER in association with a given broadcast content stream for which a user of the mobile station has elected to receive, commencing a registration process including transmitting to the base station a prescribed format of a registration message in association with the given broadcast content stream;
   responsive to conditions including the examination revealing that the indicator is set to DO NOT REGISTER in association with a given broadcast content stream, refraining from transmitting any registration messages to the base station in association with the given broadcast content stream.

2. The method of claim 1, further comprising:
   following initial registration for a given broadcast content stream, the mobile station commencing receipt of the given broadcast content stream via shared forward link broadcast channel.

3. The method of claim 1, where the registration process further comprises the mobile station delaying transmission of registration messages by a traffic-reduction period comprising one of the following:
   a fixed delay;
   a random delay;
   a variable delay derived from information internal to the mobile station;
   a variable delay derived from information obtained from the base station and unrelated to registration;
   an actual time delay derived from a registration wait factor for the given broadcast content stream, the registration wait factor obtained from the broadcast parameters message.

4. The method of claim 1, where:
   the broadcast parameters message further includes one or more registration wait factors;
   the operations further comprise:
   obtaining the registration wait factor from the broadcast parameters message;
   utilizing the obtained registration wait factor to derive an actual time delay;
   utilizing the actual time delay as a countdown timer to trigger repetition of the operation of examining contents of the broadcast parameters message.

5. The method of claim 1, where:
   transmitting a prescribed format of wireless registration message further comprises, for each mobile station, transmitting at least the following security items: subscriber identification code, message authentication code derived from selected other components of the registration message, and sequence code indicating a relative sequence of the registration message relative to other messages transmitted by the mobile station.

6. The method of claim 1, where:
   the mobile station limits performance of the commencing and refraining operations to broadcast content streams subscribed-to by the mobile station.

7. A non-transitory computer readable storage medium tangibly embodying a computer program of computer-readable instructions executable by a digital data processor to perform operations for a wireless mobile station to participate in a scheme of counting mobile stations receiving broadcast content from a base station in a wireless communications network, the operations comprising:
   receiving wireless transmission of a broadcast parameters message from a base station, the message including an identity of at least one broadcast content stream and, in association with each broadcast content stream, an indicator having one of the following values: REGISTER, DO NOT REGISTER;
   examining contents of the broadcast parameters message;
   responsive to conditions including the examination revealing that the indicator is set to REGISTER in association with a given broadcast content stream for which a user of the mobile station has elected to receive, commencing a registration process including transmitting to the base station a prescribed format of a registration message in association with the given broadcast content stream;
   responsive to conditions including the examination revealing that the indicator is set to DO NOT REGISTER in association with a given broadcast content stream, refraining from transmitting any registration messages to the base station in association with the given broadcast content stream.

8. An apparatus configured to perform operations for a wireless mobile station to participate in a scheme of counting mobile stations receiving broadcast content from a base station in a wireless communications network, the apparatus comprising:

a memory; and a processor, coupled with the memory, and configured to execute a set of instructions stored in the memory, the set of instructions for:

receiving wireless transmission of a broadcast parameters message from a base station, the message including an identity of at least one broadcast content stream and, in association with each broadcast content stream, an indicator having one of the following values: REGISTER, DO NOT REGISTER;

examining contents of the broadcast parameters message;

responsive to conditions including the examination revealing that the indicator is set to REGISTER in association with a given broadcast content stream for which a user of the mobile station has elected to receive, commencing a registration process including transmitting to the base station a prescribed format of registration message in association with the given broadcast content stream;

responsive to conditions including the examination revealing that the indicator is set to DO NOT REGISTER in association with a given broadcast content stream, refraining from transmitting any registration messages to the base station in association with the given broadcast content stream.

9. A method of operating a wireless base station, comprising:

broadcasting a broadcast parameters message including an identity of at least one broadcast content stream and, in association with each broadcast content stream, an indicator having one of the following values: REGISTER, DO NOT REGISTER;

receiving any registration messages transmitted by mobile stations, such registration messages having a prescribed format and each associated with a given broadcast content stream;

responsive to a count of the registered mobile stations for a given broadcast content stream reaching a prescribed number, configuring the broadcast parameters message to include a DO NOT REGISTER indicator instead of the REGISTER indicator in association with that broadcast stream.

10. The method of claim 9, further comprising:

a prescribed time after the count of mobile stations that have registered for a given broadcast content stream reaches the prescribed number, the base station instituting a recount by configuring the indicator to REGISTER instead of DO NOT REGISTER in association with the given broadcast content stream.

11. The method of claim 9, further comprising:

responsive to the base station detecting occurrence of one or more changes of prescribed type in a given broadcast content stream, configuring the indicator to REGISTER in association with the given broadcast content stream.

12. The method of claim 9, further comprising:

responsive to a count of mobile stations that have registered for a given broadcast content stream failing to exceed a predetermined number, utilizing individual point-to-point channels to deliver the given broadcast content stream to the registered mobile stations;

responsive to a count of mobile stations that have registered for the given broadcast content stream exceeding the predetermined number, utilizing a shared forward link channel to deliver the given broadcast content stream to the registered mobile stations.

13. The method of claim 9, where the prescribed format of the registration message comprising at least the following security items: subscriber identification code, message authentication code derived from selected other components of the registration message, and sequence code indicating a relative sequence of the registration message relative to other messages transmitted by the mobile station, and further comprising:

determining validity of any received registration messages by rejecting each registration message satisfying any one or more of the following:

the subscriber identification code failing to verify identify of the transmitting mobile station;

the message authentication code showing that content of the registration message has undergone tampering;

the sequence code failing to show sequence differentiation with respect to other messages from the same mobile station.

14. The method of claim 9, where:

the broadcast parameters message identifies at least one broadcast content stream scheduled to start at a prescribed time in the future; and at the prescribed time, determining whether a count of mobile stations that have registered for a given broadcast content stream exceeds the predetermined number, and if so, utilizing a shared forward link channel to simultaneously deliver the broadcast content stream to the registered mobile stations;

if not, utilizing individual point-to-point channels to separately deliver the broadcast content stream to the registered mobile stations.

15. The method of claim 9, further comprising:

supplementing the count of mobile stations that have registered for a given broadcast content stream to additionally include any mobile stations receiving the given broadcast content stream from the base station via individual point-to-point channels.

16. A non-transitory computer-readable storage medium tangibly embodying a computer program of computer-readable instructions executable by a digital data processor to perform operations for one or more components of a wireless communications network to count wireless mobile stations receiving broadcast content from a given base station, the operations comprising:

the base station wirelessly broadcasting a broadcast parameters message including an identity of at least one broadcast content stream and, in association with each broadcast content stream, an indicator having one of the following values: REGISTER, DO NOT REGISTER;

the base station receiving any registration messages transmitted by mobile stations, such registration messages having a prescribed format and each associated with a given broadcast content stream;

responsive to a count of the registered mobile stations for a given broadcast content stream reaching a prescribed number, the base station configuring the broadcast parameters message to include a DO NOT REGISTER indicator instead of the REGISTER indicator in association with that broadcast stream.

17. Circuitry including multiple interconnected electrically conductive elements configured to perform operations for one or more components of a wireless communications network to count wireless mobile stations receiving broadcast content from a given base station, the operations comprising:

the base station wirelessly broadcasting a broadcast parameters message including an identity of at least one broadcast content stream and, in association with each broadcast content stream, an indicator having one of the following values: REGISTER, DO NOT REGISTER;

the base station receiving any registration messages transmitted by mobile stations, such registration messages having a prescribed format and each associated with a given broadcast content stream;

responsive to a count of the registered mobile stations for a given broadcast content stream reaching a prescribed number, the base station configuring the broadcast parameters message to include a DO NOT REGISTER indicator instead of the REGISTER indicator in association with that broadcast stream.

18. A base station for a wireless communications network, comprising:
 input/output;
 digital data storage;
 a processor coupled to the input/output and storage, and programmed to perform operations for the base station to count wireless mobile stations receiving broadcast content from the base station, the operations comprising:

wirelessly broadcasting a broadcast parameters message including an identity of at least one broadcast content stream and, in association with each broadcast content stream, an indicator having one of the following values: REGISTER, DO NOT REGISTER;

receiving any registration messages transmitted by mobile stations, such registration messages having a prescribed format and each associated with a given broadcast content stream;

responsive to a count of the registered mobile stations fix a given broadcast content stream reaching a prescribed number, configuring the broadcast parameters message to include a DO NOT REGISTER indicator instead of the REGISTER indicator in association with that broadcast stream.

* * * * *